United States Patent Office 3,536,638
Patented Oct. 27, 1970

3,536,638
BREATHABLE FILMS OF ORGANIC PLASTIC MATERIAL CONTAINING INCOMPATIBLE THERMOPLASTIC RESIN PARTICLES INCORPORATED THEREIN
Lucian P. Dosmann, South Bend, Ind., assignor to Uniroyal, Inc., New York, N.Y., a corporation of New Jersey
No Drawing. Continuation-in-part of application Ser. No. 485,089, Sept. 3, 1965, which is a continuation-in-part of application Ser. No. 289,750, June 21, 1963. This application Nov. 8, 1968, Ser. No. 774,495
Int. Cl. C08f 47/08, 47/14; D06n 3/06
U.S. Cl. 260—2.5
28 Claims

ABSTRACT OF THE DISCLOSURE

The invention relates to a "breathable" plastic film and to a method of making the same. In the method a film forming material such as a vinyl plastisol or polyurethane precursors has intimately mixed therein small particles of an incompatible meltable material such as polyethylene. The polyethylene is in a physical form having a bulk density less than its actual density.

---

This application is a continuation-in-part of my copending application Ser. No. 485,089 filed Sept. 3, 1965 which in turn is a continuation-in-part of my application Ser. No. 289,750 filed June 21, 1963.

This invention relates to a porous article and to a method of making the same.

So-called simulated leather films have been made for many years, and they are widely used today in clothing, upholstery and other applications. Natural leather has a property termed "breathability," i.e., it transpires air and moisture vapor and absorbs water. Much effort has been spent to create simulated leather films which are "breathable" to the same degree as leather, and although simulated leather films of one type or another capable of transmitting gases therethrough have been used from time to time, and are used today, these films for one reason or another, have not been wholly satisfactory, and the search has continued to date for improved breathable films.

This invention contemplates novel "breathable" porous films and methods of making such films.

In this invention a film capable of absorbing water and transpiring air and moisture vapor is made by the process which comprises providing a substantially uniform mixture of a film forming material and a meltable material incompatible therewith in which the incompatible material is in a physical form having a bulk density of less than its actual density. The film forming material in this mixture is formed into film incorporating the meltable material, and the latter is melted, to produce the porous film. In one embodiment, a mixture of vinyl resin plastisol and particles of an incompatible thermoplastic resin are substantially uniformly mixed together, after which the mixture is filmed out, then heated, first to gel the resin and plasticizer, then heated further to melt the incompatible resin and to completely fuse the resin and plasticizer. In another, a mixture of a polyhydroxy-terminated polymer and an organic diisocyanate and particles of an incompatible thermoplastic resin are substantially uniformly mixed together, after which the mixture is filmed out, then treated first to cure the polyurethane, then heated to melt the incompatible material.

The product is a porous body capable of transpiring air and moisture vapor and absorbing water which comprises a mass of resin containing a multiplicity of interconnecting voids or cavities with particles of the incompatible material disposed in said cavities, with said incompatible particles being lesser in volumes than the volumes of the cavities they occupy i.e., the cavity in which a particle resides is larger volumetrically than the particle. This porous product can be made in the form of film useful, for example, in clothing, upholstery and other applications where natural or simulated leathers are now used.

Various materials may be used for the porous products of this invention. Thermoplastic resinous materials and compounds thereof are suitable. The thermoplastic vinyl resins, such as polyvinyl chloride, or any combination thereof with any of the following resins, or any combination of the following resins: copolymers of vinyl chloride and vinyl acetate, polyvinylidene chloride, copolymers of vinyl chloride and diethyl maleate, copolymers of vinyl chloride and vinylidene chloride and compounds thereof, are preferred thermoplastic resinous materials. Polyurethanes are preferred for some applications. Heat sensitive latex may be used for some applications.

Polyurethane is well known in the art. It is usually a reaction product of a polyhydroxy-terminated polymer (polyester, polyether, or the like) with an organic diisocyanate, as disclosed for example in U.S. Pat. 3,004,939, Varvaro, Oct. 17, 1961 and the references cited therein.

With respect to the conventional polyurethanes that are used in the present invention, reference may be had to U.S. Pat. 2,953,839 as disclosing starting polyesters and polyethers, and describing their reaction with polyisocyanates to make polyurethanes useful in the invention. Such polyurethane is typically derived from a polymer of molecular weight from 300 to 5000 having terminal hydroxyl groups. Such polymer may be a chain extended polyester made from a glycol, preferably a mixture of ethylene and propylene glycols, and a saturated organic dicarboxylic acid, preferably adipic acid. Usually the glycol contains from 4 to 20 carbon atoms, and the acid contains from 4 to 20 carbon atoms. An excess of the glycol over the acid is used in preparing the polyester, so that the resulting polyester contains terminal hydroxyl groups. Usually such an amount of glycol is used as to give a polyester having a hydroxyl number of 22 to 225, and preferably 36 to 75, and a low acid value less than 6 and preferably less than 1. The molecular weight of the polyester usually ranges from 500 to 5,000 and preferably from 1500 to 3000. In general the most suitable polyesters are chiefly linear in type with melting point levels of 90° C. or lower.

Other examples of suitable polyesters for use in preparing the polyurethane are polyethylene adipate, polyethylene adipate-phthalate, polyneopentyl sebacate, etc. If desired small amounts of tri-alcohols such as trimethylolpropane or trimethylolethane may be included in the preparation of the glycol-dicarboxylic acid polyester, and such modified forms of polyester are included within the term polyester as used herein.

As an alternative to the polyesters just described there may be used (for reaction with the polyisocyanate) one or more members of the class of elastomer-yielding polyethers. Such polyethers are typically anhydrous chain-extended polyethers possessing ether linkages (—O—) separated by hydrocarbon chains either alkyl or aryl in nature. The ether should also contain terminal groups reactive to isocyanate, such as alcoholic hydroxyl groups. Usually the polyethers used are chiefly linear in type with melting point levels of 90° C. or lower. The molecular weight may range from 500 to 5,000 (i.e., hydroxyl number of about 225 to 22), but is preferably within the range of 750 to 3,500 (i.e., hydroxyl number of about 150 to 32). Preferred polyethers may be represented by the formula $H(OR)_n OH$ where R is a lower (2–6 carbon atoms) alkylene group and $n$ is an integer such that the molecular weight falls within the range specified. Examples of polyethers used are polyethylene glycol, polypropylene glycol, polypropyleneethylene glycol, and polytetramethylene glycol. Mixtures of polyesters and polyethers may be used as well as polyesters derived from polyethers [e.g. poly(diethylene glycol adipate), poly(triethylene glycol adipate)].

Further examples of polyesters or polyethers suitable for forming polyurethanes useful in the invention are the polyesters and polyethers mentioned in U.S. Pats. 2,606,162, Coffey, Aug. 5, 1952; 2,801,990, Seeger, Aug. 6, 1958; 2,801,648, Anderson, Aug. 6, 1957; and 2,814,606, Stilmar, Nov. 26, 1957. It is desired to emphasize that the invention contemplates the use of any and all such known polyethers or polyesters suitable for reaction with an aromatic diisocyanate to yield a polyurethane capable of being cured to an elastomeric state.

The polyester or polyether is, as indicated, reacted with an aromatic diisocyanate, such as p,p'-diphenylmethane diisocyanate of toluene diisocyanate, using a considerable molar excess, commonly from a 20% to a 250% and preferably from a 50% to a 150% molar excess, of the aromatic diisocyanate over that amount which would be required to react with all of the alcoholic hydroxyl groups furnished by the polyester. In accordance with known practice, the reaction is frequently effected by mixing the polyester and the aromatic diisocyanate under anhydrous conditions either at room temperature, or at a moderately elevated temperature, to form a soluble (in methyl ethyl ketone), uncured, polyurethane which is an essentially linear polyurethane having terminal isocyanate groups.

Representative of the aromatic diisocyanates that may be mentioned, by way of non-limiting examples, are such materials as m- and p-phenylene diisocyanate, toluene diisocyanate, p,p'-diphenyl diisocyanate and 1,5-napthalene diisocyanate, and in this category we include the aromatic-aliphatic diisocyanates such as p,p'-diphenylmethane diisocyanate. Many other aromatic diisocyanates suitable for reaction with polyesters or the like to yield polyurethanes capable of being cured to the elastomeric state are disclosed in the prior art (such as the patents referred to previously), and it is desired to emphasize that the invention embraces the use of any and all such aromatic diisocyanates.

The preferred class of urethanes are mixtures of high and low molecular weight reaction products of hydroxy terminated polyester of polyethers with diisocyanate. The polyol, diisocyanates, catalyst, and polyethylene comprise a system that is fluid enough to pour and spread. No solvent is used in the system, since the polyol itself is a fluid. The polyurethane system is readily catalyzed to promote gel, is thermoplastic for a period sufficient to allow embossing, and becomes thermosetting after several days aging.

In a sometimes preferred vinyl resin embodiment, the resin in the mixture is in a vinyl resin plastisol prepared by dispersing finely divided vinyl resin in a plasticizer therefor, or in a diluted plastisol to which an organic diluent has been added. The formulation of plastisols and their use are now well known by those skilled in the art; an early description thereof is contained in Modern Plastics 26, 78 (April 1949) by Perrone and Neuwirth.

The material which is to form the body of the porous product is mixed with a meltable material incompatible therewith. Various materials may be used for the meltable, incompatible material as will readily occur to those skilled in this art. Thus for some applications certain waxes and polypropylenes may be used, but the now preferred material is polyethylene. These materials are thermoplastic and will melt upon being subjected to heat as, for example, during the fusion cycle of the now preferred vinyl resin plastisols which are used for the body of the porous product.

Polyethylene is exceptionally well suited for the incompatible materials of this invention, because it melts between 188° F. and 230° F. This is substantially above the normal range of gel temperatures for vinyl plastisols, yet below the normal range of fusion temperatures for such plastisols. Thus, depending on the duration of exposure, vinyl plastisols normally gel in a range of about 100° F.–180° F., and fuse, i.e. completely solvate or flux, in a range of about 250° F.–360° F. The polyurethanes may be heated to the melting range of polyethylene and above without degrading the polyurethane.

The incompatible material should be in a physical form having a bulk density less than its actual density. Desirably, the particles of incompatible material may have a maximum particle dimension of less than 500 microns, and a minimum particle dimension greater than 8 microns. In the preferred embodiments the particle dimension will fall in the range from 140 microns to 8 microns. It is also desirable if the material is in the form of small particles or powders which, preferably, are irregularly shaped. These incompatible thermoplastic materials are readily available commercially in a form suitable for use in this invention. Thus powdered polyethylene in a mixture of particle sizes ranging from 8 to 30 microns is available under the name Microthene type FN–500; powdered polyethylene in a mixture of particle sizes ranging from 8 to 30 microns is available under the name Microthene type FN–510; powdered polyethylene in a mixture of particle sizes ranging from 40 (420 micron) to 230 (63 micron) ASTM mesh is available under the name Hi-Fax 601, powdered polyethylene having a particle size of 105 microns (approximately 140 ASTM mesh) is available under the name Microthene 620, or a mixture of particle sizes of 88–105 microns (approximately 170–140 ASTM mesh) under the name Microthene 608, and powdered polyethylene having particle sizes from 80 (177 micron) to 100 (149 micron) ASTM mesh is available under the name Alathon 10.

The particle size selected will be dictated by the properties desired in the finished product. In general the particles should be sufficiently small so as not to cause projecting bumps or humps on the surface of the finished product where this would mar its appearance, as in clothing applications. The size of the particles will also affect the moisture and air transpiration rate. The incompatible particles should be of such size that a sufficient quantity added to the base material provides for interconnecting passageways to give the desired breathability. The greater the quantity of the incompatible material, the greater the air and water permeability but the less the finished product will possess the characteristics of the base material.

The rate at which the finished material will transpire air or moisture vapor will vary depending not only upon the particle size of the incompatible material and the distribution of the incompatible particles in the body, but also upon the quantity of incompatible particles employed with a given amount of resin base. Desirably from 10 to about 60 parts by weight of the incompatible particles per 100 parts by weight of vinyl resin or polyurethane in the base compound are used.

As discussed herein, the meltable material must be incompatible with the base material, i.e. with the material which is to form the body of the product. By "incompatible" is meant the material does not fuse with, or become homogeneous with, the base material; it is a material which does not physically or chemically combine with the base material. Where the base material is a solution of a vinyl resin and a plasticizer. i.e. a fused plastisol, an incompatible material is one which does not dissolve, or dissolve in, the vinyl resin or the plasticizer or the solvated resin. Where the base material is polyurethane, an incompatible material is one which does not dissolve, or dissolve in the fluent uncured mixture of polyhydroxy-terminated polymer and organic diisocyanate or the cured polyurethane elastomer.

It is essential that the incompatible material have a bulk density less than its actual density. Further, it is now believed that incompatible particles which are irregular in shape result in films having improved breathability over those made with particles which are essentially round and smooth. This present belief is that, with the irregularly shaped particles dispersed in a suitable matrix, the matrix gels and the incompatible compound thereafter melts forming air cells within the gelled matrix to form a continuous porous construction.

With the vinyl resin plastisols containing meltable incompatible particles, when the mix is subjected to heat but before the mass is heated to a temperature sufficient to melt the incompatible particles, the vinyl resin plastisol is gelled, and as the temperature of the compound continues to rise to the fusion point, it is believed that each particle of powdered incompatible material tends to assume a spherical shape because of the surface tensions involved. It is believed this leaves minute cavities or voids alongside the particles which become minute air cells that will form interconnecting cavities or voids and provide breathability in the film. On fusion these air cells are believed to further interconnect. It is desirable to effect gel, fusion of the powdered polyethylene and fusion of the vinyl plastisol at a rate wherein the gas feed in the cells of the polyethylene particles is forced out of the film through an interconnected network of the particles and cells. Overlong fusion times at elevated temperatures tend to soften the matrix and flux over the interconnecting pores, reducing the breathability.

Because of the incompatibility of the added particles with the base material, where essentially smooth and spherically shaped particles are used the lack of adhesion between the particles and the base material promotes breathability.

The minute voids and channels are made more open by kneading or by the staking commonly used in treating leather.

The products produced by this invention may be applied to many end uses. Thus porous bodies in the form of blocks useful, for example, as filters, may be molded. Rigid films may also be molded. Flexible leather-like films may also be produced, and these are the now preferred embodiments of this invention. These films may be in the form of flat sheets such as the simulated leather sheets used in upholstery, or they may be in the form of molded films, such as the molded film boots and the like formed by slush molding or by rotationally casting vinyl plastisols in hollow open or closed molds; and they may be either supported, as with a fabric, or they may be unsupported.

If a flat sheet of film is to be formed using the now preferred powdered polyethylene as the incompatible material, the mixture can be coated onto a release paper, as by means of a reverse roll coater, or a doctor blade, or other well known coating or spreading techniques, or, if a supported film is desired, it can be coated directly onto the supporting fabric or it can be cast on a release paper and laminated to the supporting fabric, and the resulting film cured or fused.

The following specific examples will further illustrate this invention:

EXAMPLE I

A plastisol was prepared from 70 parts (all parts being by weight in Examples I to IX inclusive and in Plastisol II) of Geon 121 (a plastisol grade polyvinyl chloride resin), 30 parts of Marvinol VR-10 (a plastisol grade polyvinyl chloride resin) and 62.5 parts of dicapryl phthalate plasticizer. This was mixed to a substantially uniform mixture. 25 parts by weight of polyethylene (Microthene 620) was dispersed in 100 parts of the above plastisol compound utilizing minimum shear force to obtain a good dispersion of the powdered polyethylene in the plastisol by stirring about 15 minutes in a Lightnin mixer.

A measured charge of this compound was introduced into a hollow metal boot mold, the mold was closed and rotated in two planes while heating the mold for approximately 7 minutes at 420° F. During the heating cycle the vinyl plastisol first gelled, then the polyethylene powder melted and finally the plastisol completely fused or solvated. The mold was then cooled, after which it was opened and the product was removed. The film, i.e. the boot, was capable of transpiring moisture vapour.

PLASTISOL II 100 parts of polyvinyl chloride resin, plastisol grade, was mixed with 65 parts of dicapryl phthalate plasticizer, 5 parts of expoxidized soy bean oil type plasticizer and 3 parts of cadmium barium zinc stabilizer compound.

EXAMPLE II

To 100 parts of Plastisol II was added 22 parts of Hi-Fax 601 polyethylene. These were mixed as in Example I, and the mixture was cast on a casting paper by a reverse roll coater and was then heated by passing the cast wet film and paper through a conventional compartmentalized fusing over in a 7 minute pass at temperatures ranging up to a maximum of 420° F. to fuse the same.

EXAMPLE III

To 100 parts of Plastisol II 22 parts of Microthene 608 was added. These were mixed as in Example I, and the mixture of plastisol and polyethylene was cast and fused as in Example II.

EXAMPLE IV

To 100 parts of Plastisol II 28 parts by weight of Microthene 620 polyethylene was added. These were mixed as in Example I, and the resulting mixture was cast and fused as in Example II.

EXAMPLE V

To 100 parts of Plastisol II was added 34 parts of Microthene 620 polyethylene. These were mixed as in Example I, and the resulting mixture was cast and fused as in Example II.

EXAMPLE VI

To 100 parts of Plastisol II 11 parts of Microthene 608 polyethylene was added. These were mixed as in Example I, and the resulting mixture was cast and fused as in Example II.

EXAMPLE VII

To 100 parts of the Plastisol II was added 14 parts of Alathone 10 polyethylene. These were mixed as in Example I, and the resulting mixture was cast and fused as in Example II.

EXAMPLE VIII

A plastisol was prepared from 70 parts of Geon 121 (a plastisol grade polyvinyl chloride resin), 30 parts of Marvinol VR-10 (a plastisol grade polyvinyl chloride resin) and 62.5 parts of dicapryl phthalate plasticizer. This was mixed to a substantially uniform mixture. 25 parts of by weight of Microthene type FN-500 was dispersed in 100 parts of this plastisol compound by mixing as in Example I. This mixture was cast and fused as in Example II.

EXAMPLE IX

A plastisol was prepared from 70 parts of Geon 121 (a plastisol grade polyvinyl chloride resin), 30 parts of Marvinol VR-10 (a plastisol grade polyvinyl chloride resin) and 62.5 parts of dicapryl phthalate plasticizer. This was mixed to a substantially uniform mixture. 25 parts of by weight of Microthene type FN-50 was dispersed in 100 parts of this plastisol compound by mixing as in Example I. The mixture was cast and fused as in Example II.

Polyol formulation 1

| | Parts by weight |
|---|---|
| Polyester (multron R16–a polyester consisting of two diols and one triol, with a molecular weight of 1700 or an equivalent weight of 810) | 85 |
| Polyethylene powder (Microthene 620) | 20 |
| Isocyanate (143L—a low viscosity isocyanate manufactured by Upjohn) | 15 |
| Stannous octoate | 0.25 |
| | 120.25 |

Polyol formulation 2

| | |
|---|---|
| Polytetramethylene ether glycol with a molecular weight of 2000 | 71 |
| Butane diol 1,4 | 4 |
| Polyethylene (Microthene 620) | 20 |
| Isocyanate (143L) | 24 |
| Stannous octoate | 0.25 |
| | 119.25 |

EXAMPLE X

Polyol formulation 1, except for the isocyanate was mixed in a Lightnin mixer until smooth, about 15 minutes, to disperse the polyethylene therein. The well mixed compound was fed to a polyurethane dispenser of the basket mixing type, as was the isocyanate, where the two were mixed, and from which the mixture was dispersed to a knife over roll coater where it was spread on a coating paper in a film 18 mil thick of gelled polyol formulation. It was next placed in a forced hot air oven (1300 to 1500 cubic feet of circulating air) at 150° F. for 15 minutes. It was removed from the oven and allowed to complete its cure at room temperature (about a day). Thereafter it was heated in the circulating hot air oven for 10 minutes at 300° F.

EXAMPLE XI

Example X was repeated but using polyol formulation 2.

The resulting porous films of Example II thru XI inclusive were tested to determine their porosity by means of a Gurley Densometer made by W. & L. E. Gurley Company of Troy, N.Y. This densometer consists of a base to which is fastened a hollow upstanding cylindrical open top pipe. This pipe, open at the top and closed by the base, forms a reservoir which is partially filled with a lubricating fluid such as oil, liquid plasticizer or the like. A second hollow cylinder having an open bottom end and designed to fit and freely slide within the open top of the first mentioned cylinder to form a piston arrangement is also provided. The top of the second cylinder is closed except for a 1" diameter circular hole centered on the axis of the cylinder. A sealing gasket surrounds the 1" diameter hole and the sample to be tested is placed over the gasket so that it completely covers the 1" diameter hole. A top sealing ring also containing a 1" diameter hole is placed over the sample to be tested with the hole in the ring in registry with the hole in the open upper end of the second cylinder. This top sealing ring is sealed to the sample material to be tested so when the second cylinder is placed in the first cylinder the air trapped within the second cylinder by the lubricating fluid in the first cylinder can escape from the second cylinder only by passing through a 1" diameter segment of the sample to be tested. The second hollow cylinder, which weighs 568 grams exclusive of the sample to be tested, has its sides calibrated in cubic centimeters, so the rate at which air escapes through the sample, i.e. the rate at which the second cylinder sinks into the lubricating fluid, may be timed.

Using this Gurley Densometer in this way to test the products of this invention and using di(2-ethylhexyl)-phthalate as the lubricant in the first cylinder, it took 65 seconds for 300 cubic centimeters of air to pass through Example II, 25 seconds for the same volume of air to pass through Example III, 120 seconds for the same volume of air to pass through Example IV, 90 seconds for the same volume of air to pass through Example V, 300 seconds for the same volume of air to pass through Example VI, 40 seconds for the same volume of air to pass through Example VII, 380 seconds for the same volume of air to pass through Example VIII, 210 seconds for the same volume of air to pass through Example IX, 625 seconds for the same volume of air to pass through Example X, and 400 seconds for the same volume of air to pass through Example XI.

For purposes of comparison, a sample of top grain leather was subjected to the same tests. It took 330 seconds for 150 cubic centimeters of air to pass through the leather film.

It is found that stretching the products of this invention enhances their breathability. Although it is not certain why this occurs, it is thought that perhaps stretching further frees the incompatible material from the base compound or perhaps shifts the material within the cavities to distort them slightly. This stretching can be done, on a film, for example, by tentering the same in a well known manner.

Having thus described my invention, what I claim and desire to protect by Letters Patent is:

1. In a process of making a film capable of passing gases, the steps which comprise providing a substantially uniform mixture of a fluent organic plastic film forming material selected from the group consisting of thermoplastic vinyl resin materials, and a mixture of a chiefly linear thermoplastic polyhydroxyl-terminated polymer and an organic diisocyanate which react to form a polyurethane under the conditions of the process, and particles of a thermoplastic resin incompatible with said film forming material, said incompatible resin in said mixture being in a physical form having a bulk density less than its actual density, forming said mixture into a layer, forming said film forming material in said layer into a matrix without bringing said incompatible resin to its melting point by treating said mixture at a temperature below the melting point of the incompatible resin to gel the said film forming material and thereafter melting said incompatible resin, resolidifying said incompatible resin, and retaining said incompatible resin in cavities in the completed film.

2. In a process of making a film capable of passing gases, the steps which comprise providing a substantially uniform mixture of a chiefly linear thermoplastic polyhydroxyl-terminated polymer and an organic diisocyanate film forming material which react to form a polyurethane under the conditions of the process and particles of a thermoplastic resin incompatible with said film forming material, said incompatible resin in said mixture being in a physical form having a bulk density less than its actual density, forming said mixture into a layer, forming said film forming material in said layer into a matrix without bringing said incompatible resin to its melting point by treating said mixture at a temperature below the melting point of the incompatible resin to gel the said film forming material and thereafter melting said incompatible resin, resolidifying said incompatible resin, retaining said incompatible resin in cavities in the completed film, and stretching and flexing the completed film to increase its ability to pass gases.

3. The process of claim 2 including the step of providing said mixture in the form of (A) 100 parts by weight of the polyhydroxy-terminated polymer and an organic diisocyanate and (B) between about 10 and about 60 parts by weight of said incompatible resin.

4. The process of claim 3 including the step of providing said mixture in the form of (A) 100 parts by weight of the polyhydroxy-terminated polymer and an organic diisocyanate and (B- between about 15 and about 30 parts by weight of said incompatible resin.

5. The process of claim 4 including the step of providing the incompatible resin in the form of irregularly shaped particles.

6. The process of claim 5 including the step of providing polyethylene as the incompatible resin.

7. The process of claim 4 including the step of molding the film in the form of a contoured article simultaneously with the forming thereof.

8. The process of claim 3 including the step of providing polyethylene as the incompatible resin.

9. The process of claim 3 including the step of providing the incompatible resin in the form of irregularly shaped particles.

10. The process of claim 9 including the step of providing polyethylene as the incompatible resin.

11. The process of claim 2 in which said polyhydroxy-terminated polymer is a polyester and in which said incompatible resin is polyethylene.

12. The process of claim 2 in which said polyhydroxy-terminated polymer is a polyether and in which said incompatible resin is polyethylene.

13. A process of making film capable of passing gases, which comprises providing a mixture of a thermoplastic vinyl resinous material capable to being formed into film upon heating thereof and particles of a resin incompatible with said resinous material, forming said mixture into a layer, said film forming material in said layer being capable of being formed into a matrix at a layer temperature beneath a layer temperature at which said incompatible resin is melted, said incompatible resin being heat meltable at temperatures at which said resinous material is formed into film, said incompatible resin in said mixture being in a physical form having a bulk density less than its actual density, forming said film forming material in said layer into a matrix by heating said mixture at a layer temperature below the melting point of the incompatible resin to gel the said thermoplastic resinous material without heating said incompatible resin to its melting point and thereafter heating said mixture to form said resinous material into film and to melt said incompatible resin, resolidifying said incompatible resin, and retaining said incompatible resin in cavities in the completed film.

14. A process of making film capable of passing gases which comprises providing a mixture of a dispersion of a thermoplastic polyvinyl resin in a plasticizer therefor and particles of a thermoplastic resin incompatible with said vinyl resin substantially uniformly mixed with said vinyl resin and plasticizer, said vinyl resin in said layer being capable of being formed into a matrix at a layer temperature beneath a layer temperature at which said incompatible resin is melted, said incompatible resin being meltable at a temperature not above about the fusion temperature of said resin and plasticizer, said incompatible resin being in the form of small particles having a maximum particle dimension greater than about 8 microns and less than about 420 microns, arranging said mixture in a film forming layer and heating the same to a temperature below the melting point of the incompatible resin sufficient to gel said vinyl resin and plasticizer, thereafter further heating the same to melt said incompatible resin and to fuse said resin and plasticizer, resolidifying said incompatible resin in cavities in the completed film.

15. The process of claim 13 including the step of providing said mixture in the form of a plastisol containing between about 10 and about 60 parts by weight of said incompatible resin per 100 parts of said polyvinyl resin.

16. The process of claim 15 including the step of providing said mixture in the form of a plastisol containing between about 15 and about 30 parts by weight of said incompatible resin per 100 parts of polyvinyl resin.

17. The process of claim 16 including the step of providing the incompatible resin in the form of irregular shaped particles.

18. The process of claim 17 including the step of providing polyethylene as the incompatible resin.

19. The process of claim 16 including the step of molding the film in the form of a contoured article simultaneously with the forming thereof.

20. The process of claim 19 including the step of providing polyethylene as the incompatible resin.

21. The process of claim 15 including the step of providing the incompatible resin in the form of irregularly shaped particles.

22. The process of claim 21 including the step of providing polyethylene as the incompatible resin.

23. A porous film comprising a film formed of a solution of thermoplastic vinyl resin in a plasticizer therefor, said film defining a multiplicity of cavities dispersed throughout said film, said cavities being interconnected, said film containing substantially solid, substantially non-divided particles of a thermoplastic resin incompatible with said vinyl resin in said cavities with said particles being lesser in volumes than the volumes of said cavities, said cavities having a maximum dimension greater than about 8 microns and less than about 140 microns, said particles of incompatible resin being spaced from parts of the walls of said cavities whereby said film defines a multiplicity of interconnected voids alongside said particles dispersed throughout said film, said voids being arranged to permit a gas to pass completely through said film from one side thereof to the other.

24. Film according to claim 23 in which the incompatible resin is approximately uniformly dispersed in said film, there being about 10 to 60 parts by weight of incompatible resin per 100 parts of vinyl resin in said film.

25. Film according to claim 24 in which there is about 15 to 30 parts by weight of incompatible resin per 100 parts of vinyl resin.

26. Film according to claim 25 in which the cavities have irregular shapes.

27. Film according to claim 24 in which the incompatible material is polyethylene.

28. A porous film comprising a film formed of a polyurethane elastomer reaction product of a chiefly linear thermoplastic polyhydroxyl-terminated polymer and an organic diisocyanate, said film defining a multiplicity of cavities dispersed throughout said film, said cavities being interconnected, said film containing substantially solid, substantially non-divided particles of a thermoplastic resin incompatible with said polyurethane elastomer in said cavities with said particles being lesser in volumes than the volumes of said cavities, said cavities having a maximum dimension greater than about 8 microns and less than about 140 microns, said particles of incompatible resin being spaced from parts of the walls of said cavities whereby said film defines a multiplicity of interconnected voids alongside said particles dispersed throughout said film, said voids being arranged to permit a gas to pass completely through said film from one side thereof to the other.

References Cited

UNITED STATES PATENTS

| 2,673,825 | 3/1954 | Biefeld et al. | 260—2.5 |
| 2,797,201 | 6/1967 | Veatch et al. | |
| 3,143,436 | 8/1964 | Dosmann | 117—135.5 |

MURRAY TILLMAN, Primary Examiner

W. J. BRIGGS, SR., Assistant Examiner

U.S. Cl. X.R.

117—135.5; 260—31.2, 859, 896, 897